United States Patent
Caspi et al.

(10) Patent No.: US 7,450,934 B2
(45) Date of Patent: Nov. 11, 2008

(54) APPARATUS AND METHOD FOR IM TO PTT CORRELATION OF MOBILE PHONES AS ASSOCIATED DEVICES

(75) Inventors: Rami Caspi, Sunnyvale, CA (US); William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 81 days.

(21) Appl. No.: 10/941,467

(22) Filed: Sep. 14, 2004

(65) Prior Publication Data
US 2006/0058012 A1     Mar. 16, 2006

(51) Int. Cl.
*H04M 11/00*     (2006.01)
(52) U.S. Cl. ............... 455/415; 455/466; 455/414.1
(58) Field of Classification Search ............. 455/416, 455/466; 379/120; 370/352
See application file for complete search history.

(56) References Cited

U.S. PATENT DOCUMENTS

| | | | | |
|---|---|---|---|---|
| 7,099,288 | B1 * | 8/2006 | Parker et al. | 370/259 |
| 2004/0185883 | A1 * | 9/2004 | Rukman | 455/466 |
| 2005/0165914 | A1 * | 7/2005 | Moore et al. | 709/219 |
| 2005/0180395 | A1 * | 8/2005 | Moore et al. | 370/352 |
| 2005/0198164 | A1 * | 9/2005 | Moore et al. | 709/206 |
| 2005/0232241 | A1 * | 10/2005 | Wu et al. | 370/352 |
| 2006/0010200 | A1 * | 1/2006 | Mousseau et al. | 709/204 |

* cited by examiner

*Primary Examiner*—George Eng
*Assistant Examiner*—Muthuswamy G Manoharan

(57) ABSTRACT

Some embodiments provide a system and method for enabling automatic call configuration to associated devices of parties involved in a data session. The call configuration involves a computing device utilized by an originating party. The originating party has an associated device other than the computing device which can be used for supplemental communication. The originating party picks or initiates a process which picks one or more destination parties to which supplemental communication is desired. Identifiers identifying a destination party or parties is forwarded to a mobile application server. The mobile application server can then perform an optional look-up to determine unique device identifiers for associated devices of the destination party or parties. The destination party identifier(s) and/or unique device identifiers is sent by the mobile application server to the associated device of the originating party. The associated device of the originating party is automatically configured to directly connect to the destination device with a single button press, like the PTT button found in some cell phone models.

42 Claims, 6 Drawing Sheets

APPARATUS AND METHOD FOR IM TO PTT CORRELATION OF MOBILE PHONES AS ASSOCIATED DEVICES

BACKGROUND

1. Field

This application relates generally to conferencing and communications.

2. Related Art

Instant messaging sessions, instant messaging conferences, and data collaboration sessions involve a party (such as a group of people or an individual) communicating over a data and/or telephony network with one or more other parties. Instant messaging sessions can be managed by applications such as MSN Messenger™ and AOL Instant Messenger™ while collaboration sessions can be managed by technologies such as OpenScape™, LiveMeeting™, NetMeeting™ and WebEx™. Using such software, it may be possible to associate a particular party with one or more devices such as a cell phone or PDA. The associated device often offers alternate or supplementary communication capability (such as voice telephony) which may not be primary form of communication in the session. For instance, a data collaboration session using a PC may also designate a cell phone as an associated device for a given party.

However, though parties are associated in a logical sense with a device, there is often no functional interactivity with the associated device in the session. For instance, in cell phones, there is a PTT (Push-To-Talk) feature where the last number dialed will appear automatically such that pushing just the "Talk" button would attempt to reconnect you with that last dialed number. It would be useful to use the messaging or collaboration session to access and activate features such as PTT that may be available on associated devices. Such interactivity would make the session more feature-rich and user friendly.

BRIEF DESCRIPTION OF THE DRAWINGS

Some embodiments are illustrated in the accompanying figures, in which like reference numerals designate like parts, and wherein.

DETAILED DESCRIPTION

Figure 1:
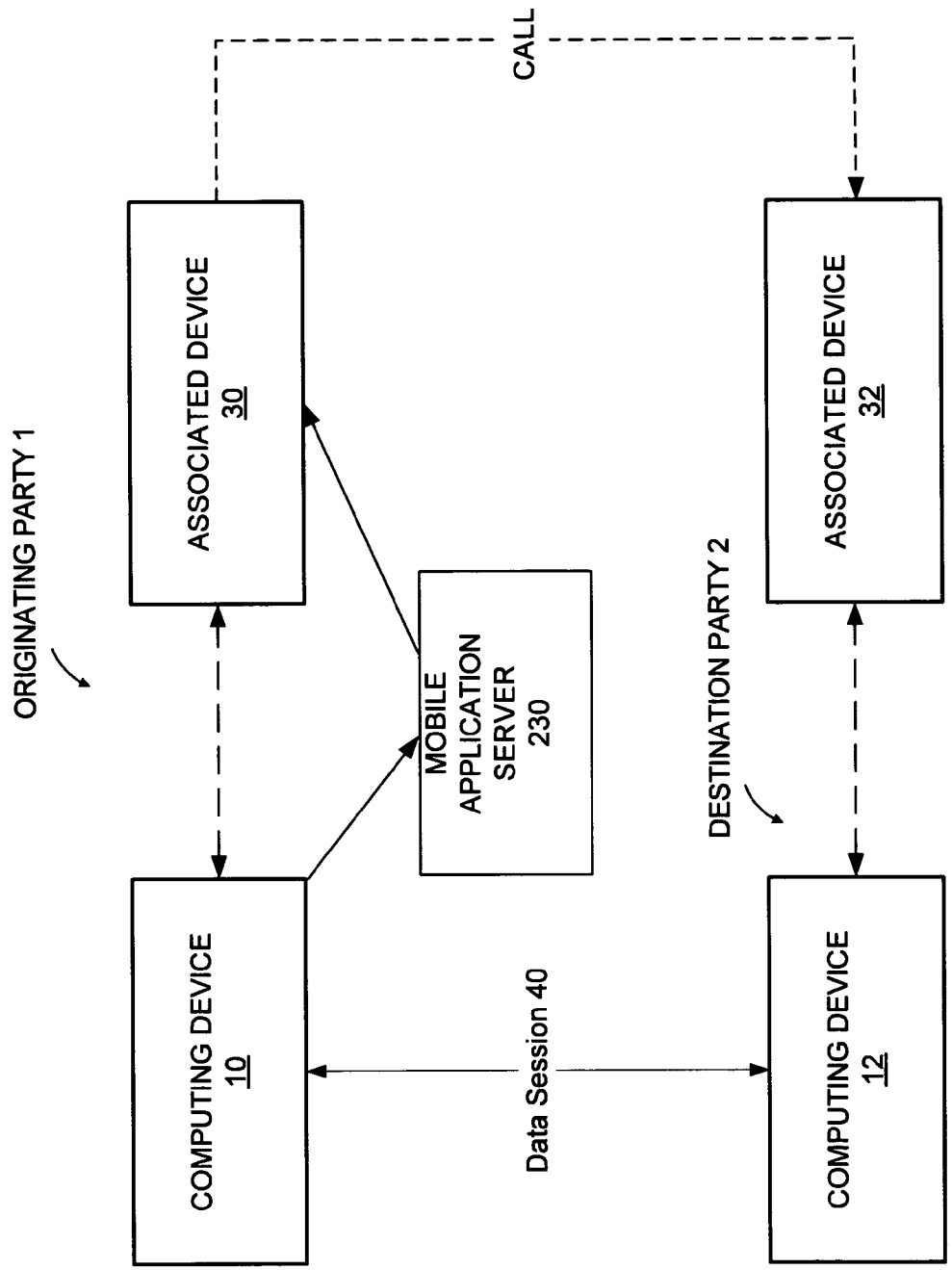
FIG. 1 is a block diagram of a system according to some embodiments of the invention.

Some embodiments provide a system and method for enabling automatic call configuration on associated devices of parties involved in a data session. The data session involves a computing device utilized by an originating party. The originating party has an associated device other than the computing device which can be used for supplemental communication. Using the computing device, the originating party picks or initiates a process which picks one or more destination parties to which supplemental communication is desired. Identifiers identifying a destination party or parties is forwarded from the computing device to a mobile application server. The mobile application server can then perform an optional look-up to determine unique device identifiers for communication devices of the destination party or parties. The destination party identifier(s) and/or unique device identifiers is sent by the mobile application server to the associated device of the originating party. In connection with this, the mobile application server will also configure a push-to-talk (PTT) capability or some smart calling or redial feature of the associated device of the originating party.

In some embodiments, the associated device of the originating party is a cellular telephone. In some embodiments of the invention, the data session is an instance messaging session, an instant messaging conference, a data collaboration session or other conference call. For instance, in an instant messaging data session between two parties, an originating party can request via their computing device to enable call configuration on their cell phone in order to place a call to the other party, the destination party. The computing device sends an identifier such as a name and/or phone number to a mobile application server. The mobile application server forwards the name/number of the destination party to the cell phone of the originating party. Simultaneously or contemporaneously, the mobile application server can configure the PTT capability of the cell phone so that a call to the name/number that is sent can be initiated with a smart key like a "Talk" key on the cell phone. This mechanism resembles the last number dialed feature on cell phones in which the last number dialed appears and can be redialed with the Talk or similar button. However, in our case the cell phone cannot use the redial button since the number to be dialed is not necessarily stored there.

The same process can be used in a situation where the data session involves multiple parties, and thus, multiple possible call destinations. In such embodiments, a list of names/numbers is sent to the cell phone of the originating party so that the originating party can select whichever destination party they may desire to initiate a call to, using the PTT button. In cases where the number of the destination party or parties is not present in the computing device of the originating party, the mobile application server can perform a look-up for the phone number and send this information along with the name to the cell phone of the originating party.

FIG. 1 is a block diagram of a system according to some embodiments. An originating party 1 is shown utilizing a computing device 10 and associated device 30. A data session 40 between the originating party 1 and a destination party 2 is illustrated. The data session 40 could be an instant messaging session or videoconference and the like. Destination party 2 would also utilize a computing device 12 and associated device 32. The associated device 30 is "associated" with the party 1 and not necessarily with the computing device 10. Likewise, the associated device 32 is associated with the party 2 and not the computing device 12. Also illustrated is a mobile application server 230 which is described in more detail below. Some embodiments are generally described below with respect to FIG. 1, with more detailed descriptions thereof to follow. The words "party" and "participant" or "parties" and "participants" both have the same intended meaning of one or more individuals or groups involved in a data session, and are used interchangeably throughout.

Computing devices 10 and 12 may be computer systems or similar devices capable of participating in a data session using a collaboration application such as OpenScape™ or WebEX™ or instant messaging application such as MSN Messenger™. The data session 40 is initiated by a user (or automated task) either on computing device 10 and/or computing device 12 and may include definitions/locations of the participants, nicknames, timetables, device associations for participants, and so forth. The data session 40 may also include voice conferencing and/or video conferencing which can be configured as desired. This may include the parties 1 and 2 utilizing an associated devices (shown as devices 30 and 32) such as land-line telephone or cellular telephone. The establishment of a typical messaging/conferencing/collaboration session is well-known in the art and not discussed in further detail.

In some embodiments, data session 40 can make use of an application such as an OpenScape® (a communications suite developed by Siemens AG) service which configures and manages the data session 40. The secondary application communicates with mobile application server 230 such as an IMS Server (IP Multimedia Subsystem) or other similar mobile application server. The IMS Server is an application server developed by Siemens AG for transacting data with mobile communication devices. The maintenance of the list of parties and associated devices can also be handled by such applications running on either computing device 10 or 12, mobile application server 230 or even on a third party device.

The associated device 30 can be an analog cellular telephone and/or a digital cellular telephone, or satellite-based mobile phone or any wireless communication device which has voice capability and a PTT button. Examples of such devices include CDMA (Code Division Multiple Access) based devices, TDMA (Time Division Multiple Access), W-CDMA (Wideband CDMA) or GSM (Global System for Mobile communications). In some embodiments, the associated device 30 may be a 2 G, 2.5 G, 3 G, or 3 gPP enabled device. The associated device 30 typically has a data channel (such as GPRS (General Packet Radio Service) or messaging channel (such as an SMS (Short Message Service) channel) and may be capable of transacting data with other networks using WAP (Wireless Application Protocol) and the like. Using one or more of these capabilities, the associated device 30 can receive forwarded name/phone number information from mobile application server 230 as discussed further below. Associated device 30 may also have its PTT feature, if any, configured by mobile application server 230 using this data channel or messaging channel or other appropriate capability.

Mobile application server 230 is an application server which may be present in or accessible by a base station of a cellular network or other communications relaying and networking center. One example is IMS (see description above) which allows interworking and communication amongst IP-based networks, cellular technologies (such as GSM/GPRS) and wired telephony technologies (such as PSTN) and thus enables a rich variety of data (such as voice, voice-over-IP, video, video-over-IP, instant messages, text, files, and applications to be passed from one to another). The mobile application server 230 may also be available to computing device 10 or 12 via a data network such as the Internet.

In accordance with various embodiments of the invention, computing device 10 would be utilized by a party to participate in data session 40. The data session 40 may present or make available to either party 1 or 2 a list of all of parties. Included in this list may be the name of each party and, optionally, a telephone number or other identifier for an associated device for that party. The invention enables automatic call configuration of an associated device for an originating party in order that the originating party can place a call to a destination party. In the example provided, party 1 is designated originating party 1 while party 2 is designated as destination party 2. This designation can be modified as desired, but for example purposes it is assumed that originating party 1 desires, using associated device 30, to place a call or be enabled to place a call to destination party 2.

In accordance with at least some embodiments of the invention, the originating party 1 is presented via computing device 10 with a list or selection toggle which includes an identifier for destination party 2. The identifier could any combination of a name, telephone number, nickname, etc. For example, in a Microsoft Windows Messenger application, the originating party is presented with a list of destination parties comprised of e-mail addresses. In that example, no telephone numbers are available.

In some embodiments, the identifier list for potential destination parties could be provided by the OpenScape or other similar session management application. The originating party 1 then selects the identifier for destination party 2 from the presented list or activates a dialog, menu, button or other selection mechanism on computing device 10 to indicate that call configuration is desired for destination party 2. The computing device 10 communicates the identifier for destination party to the mobile application server 230.

If the identifier includes a phone number or unique device ID which would allow a call to be placed to associated device 32, then the mobile application server 230 packages and forwards this information to associated device 30. The packaging of data may include formatting it in a manner suiting associated device 32 such as formatting it for SMS communication and the like. If there is no unique device ID or phone number with the identifier sent by computing device 10, then mobile application server 230 can look-up the phone number or unique device ID for associated device 32 using a pre-provided table, external/internal directory service or other query. After the look-up is complete, the unique device ID or phone number and/or destination identifier sent by computing device 10 can be packaged and sent to associated device 30 in such a way that allows the associated device 30 to configure its PTT button. Contemporaneously to or as a part of sending the phone number/identifier, the mobile application server 230 can also direct the associated device 30 to use the number in configuring a push-to-talk (PTT) feature, if available on associated device 30. In the context of associated device 30 being a cell phone, there is a common feature where the last number dialed appears when the "Talk" or "Ok" or similar button is activated. Thus, the mobile application server 230 may direct that the name/number sent to associated device 30 be placed in the last number dialed position/status. The result of this process is to enable originating party 1 (using associated device 30) to place a call to destination party 2 (who uses associated device 32) without having to enter the phone number. If the cell phone is equipped with a dedicated PTT button, then the result of this process is the configuration of that PTT button such that the destination party can be reached by a single push of the PTT button.

Figure 2:
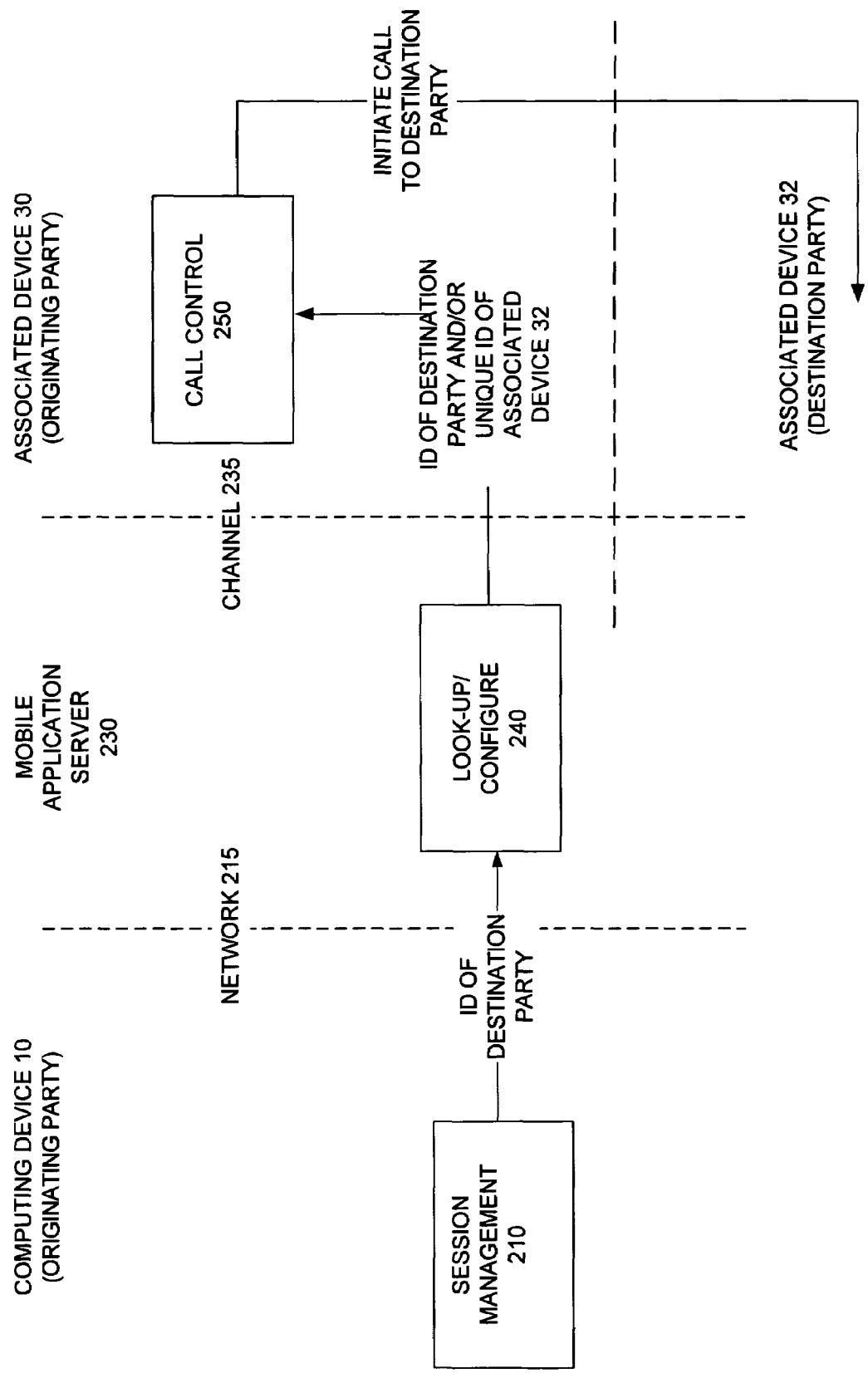
FIG. 2 is an application diagram according to some embodiments of the invention.

FIG. 2 is an application diagram according to some embodiments of the invention. The computing device 10 (of the originating party) runs a session management application 210. The session management application 210 is a messaging, conferencing and/or collaboration software (which may include white-board, voice, video, text and other features) which establishes and/or manages a data session. Session management application 210 may include software such as AOL Instant Messenger™, MSN Messenger™, Microsoft Windows Messenger™, iRC, OpenScape®, LiveMeeting™, NetMeeting™ and WebEx™ and the like. The session management application 210 configures and/or initiates a data session with a plurality of participants (parties). Each of the parties may have computing device and some of the parties may also have an associated device such as a cellular telephone.

Mobile application server 230 utilizes and may be equipped with a software application Look-Up/Configure 240. Look-Up/Configure 240 can execute one or more of the following functions:

1) Look-up or identify the associated device used by the intended destination party by using the identifier of the destination party. The identity of the destination party's associated device will involve information necessary to uniquely define it so it can be contacted over a network. A phone number, address, e-mail address or other unique ID for that associated device would serve this purpose;

2) Send the phone number/e-mail address/ID of the associated device of the destination party to the associated device of the originating party;

3) Configure on the associated device of the originating party the PTT capability, smart calling feature or last number dialed with the phone number being sent; and 4) Perform functions 1-2 above in a repetitive fashion if there is more than one possible, intended or actual destination party and send a list of names/numbers identifying these parties to the associated device of the originating party.

Function 1 is optional: the phone number (or other unique ID) of the associated device of the destination party may already have been sent by the computing device of the originating party to the mobile application server 230 so that it does not have to be looked up. The association of devices is generally assumed to be available at the mobile application server 230 or sent by the originating party thereto. The computing device of the originating p party can communicate with mobile application server 230 over a network 215 such as the Internet or an intranet.

The mobile application server 230 can communicate over some network which can access a channel 235 which can transact messages and data with one or more associated devices and computing devices. Channel 235 may include a cellular network, satellite network or access to the above networks though another network such as a packet-switched or circuit-switched network or a gateway or a combination of these, as needed. Channel 235 is intended also to represent cellular base station, base station sub-system, switches, relays, repeaters and the like which are in the network path terminating at associated device 30 and like devices. Channel 235 may also include provisioning for data channels and messaging channels (such as GPRS/SMS) which are provided in addition to the voice provisioning for mobile communication device 30. The configuration of such networks is well-known in the art. Channel 235 is used to communicate name(s) and number(s) of destination parties from mobile application server 230 to associated device 30.

The associated device 30 (utilized by the originating party) will typically have software, firmware or hardware-based routines which perform call control functions (Call Control application 250). Call Control application 250 includes activation of the "Talk" (i.e., configuring the PTT button if such exists) feature, call placement and call management. For instance, the last number dialed feature would be a part of the Call Control (CC) application 250 enabling the associated device 30 to redial the last number dialed. If the cell phone is equipped with a dedicated PTT button then configuring this key is the task of the CC application 250. In accordance with the invention, the mobile application server 230 can configure or direct the CC application 250 to replace the current last number dialed entry with the name/number of the associated device of the destination party. CC application 250 includes dialing, redialing, number display, call management and other such functions. CC application 250 is well-known in the art and typical of many if not all mobile devices and will not be discussed in detail.

As discussed herein, the CC application 250 is provided with the name of the destination party and/or the unique device ID or phone number of the associated device of the destination party such that it is then configured in its PTT button or in the redial or last number dialed queue or call logs. The originating party can then place a call to associated device of the destination party by activating the "PTT" or similar button, or by selecting the appropriate destination party from a list of such parties. For example, referring to FIG. 1, mobile application server 230 would use the ID of the destination party 2 to configure the associated device 30 of the originating party 1 with the phone number (or unique device ID) of the associated device 32. Associated device 32 is used by the destination party 2, as described above.

Figure 3:
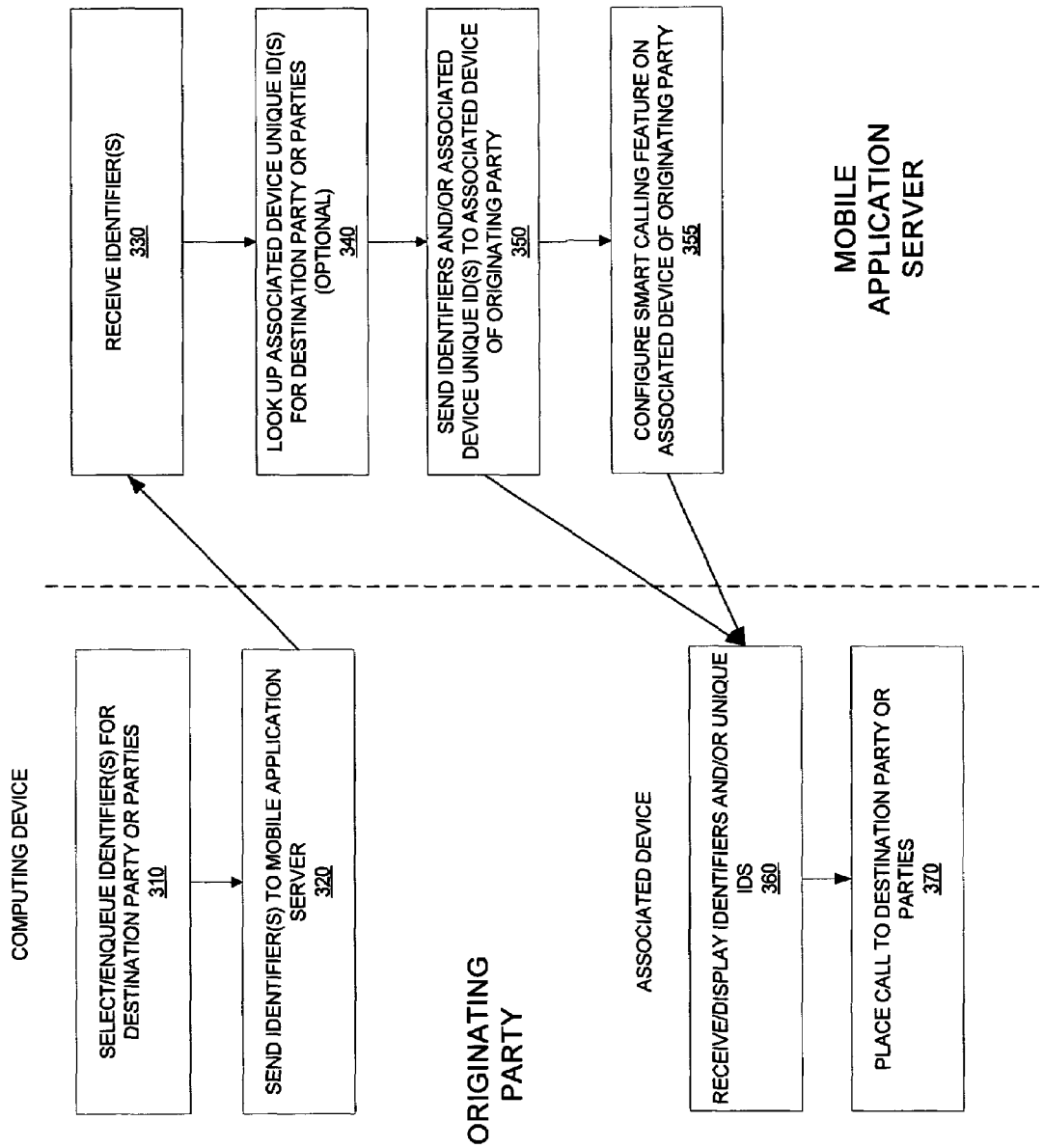
FIG. 3 is a process flow according to some embodiments of the invention.

FIG. 3 is a process flow according to some embodiments of the invention. The first step is for the originating party on its computing device to select or enqueue identifiers for the intended destination party or parties (block 310). For instance, in a conferencing session, this may involve selecting one of the participants from a list of all the participants. The computing device then activates an automatic call configuration process for an associated device. It can also be activated manually. The associated device may be identified by the communications application, such as OpenScape and/or on the mobile application server. The identifier(s) in the list or records underlying the list may be one or more of: an actual name, an e-mail address, a group name, a nickname, phone number, device ID, participant number, physical/logical address and so on. In some embodiments, the selection may involve more than one or even all of the participants. When initiated, automatic call configuration would send the identifier(s) to the mobile application server (block 320). This can be done by the originating party's computing device connecting over a network or similar communication pathway to which the mobile application server can communicate with. For instance, a buddy list in an instant messaging conference can be forwarded to the mobile application server.

The mobile application server then receives the identifier (s) (block 330). The identifiers include either the identity of the destination party or an identifier (preferably unique) of the destination party's associated device. If the identifier(s) do not indicate the unique ID of the destination party's associated device (e.g. merely a name or nickname), then the mobile application server will identify the destination party's associated device identifier (e.g. a cell phone number) using a stored list or directory query and the like (block 340). The associated device can usually be identified by a unique device ID or a phone number or network address or any other combination of these. The stored list, if any, may have been the result of an OpenScape server sending the mobile application server a list of all parties and any associated device for each party. For instance, if a list of parties in a videoconferencing session is selected as possible destination parties, then the entire list may be sent to the mobile application server. For each entry in the list, either only the identifier of the party or an identifier of the party along with an identifier (unique ID/phone number/address) of the associated device of that party. If the unique ID/number of the associated device is not available for a given party, the mobile application server looks up what the associated device for that party is (block 340).

Identification of the associated device is equivalent logically to finding the phone number or device ID or address of the associated device.

The identifier(s) of the parties (or party) and the unique ID/number/address of the associated device for that party is sent to the associated device of the originating party (block 350). Contemporaneously or as part of the same process as block 350, the mobile application server will configure the smart calling feature on the associated device with the sent identifiers and unique ID/number/address (block 355). For instance, for a single destination party, the party's name and phone number (for their associated device) is sent to the associated device of the originating party and stored as at the PPT button buffer or the last number dialed entry. This process can be directed from the mobile application server.

The associated device of the originating party receives and optionally displays the identifier and/or unique ID/number/address (block 360). This then enables the originating party to place a call to the destination party or parties by activating the smart calling feature (block 370). More precisely, the call is placed to the associated device of the destination party. The process blocks shown in FIG. 3 may be occurring many times during the data session and may affect many different participants. Any of the participants of the data session could become an originating party or a destination party at any time based on the dynamics of the session.

Figure 4A:
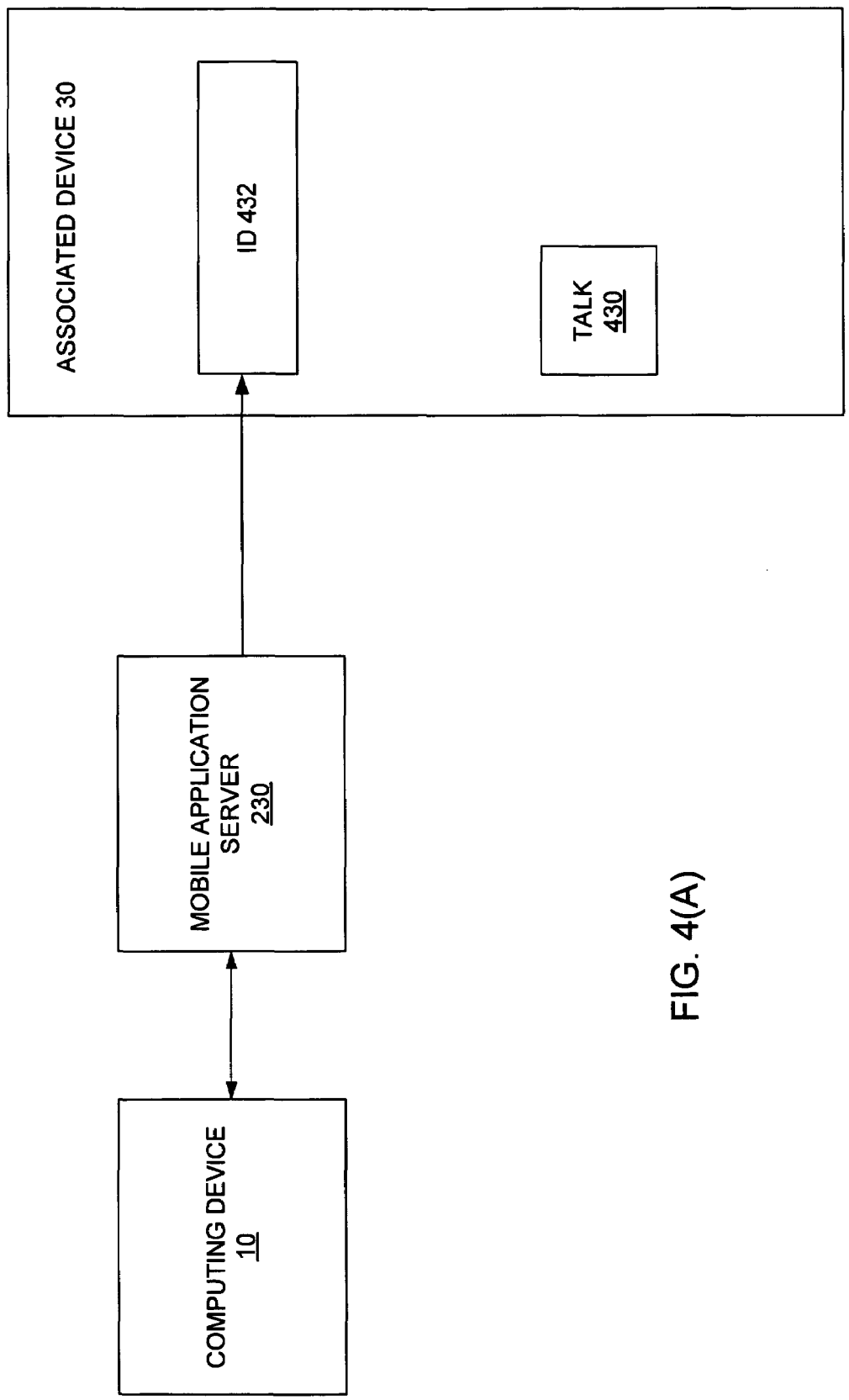
FIG. 4(A) is a block diagram of single destination call configuration according to some embodiments of the invention.

FIG. 4(A) is a block diagram of single destination automatic call configuration according to some embodiments of the invention. An originating party initiates automatic call configuration during a messaging or data session by selecting the identifier of the intended destination party (who is a participant in the session) using a cursor or selection bar or other input device connected to the computing device 10. For instance, this may involve scrolling a list of parties to the session and selecting/highlighting the intended destination party's identifier (such as nickname, e-mail address or actual name). Computing device 10 may also present an "initiate" button or menu item that can be activated by the originating party in conjunction with such a selection. In the case of single party to single party instant messaging, no party selection would be required since there is only one possible destination party, and the process of configuring the associated device of the originating party is, thus, done automatically. However, it may still be necessary to activate a command/menu/button to initiate the process in case of a multiparty session.

As shown, FIG. 4(A) assumes a single destination party is selected which has an associated device 32. The selected identifier is sent from computing device 10 to mobile application server 230. Mobile application server 230 may look-up an identifier 432 for associated device 32 which uniquely identifies it. ID 432 may be a phone number of the destination party or internet/network address and the like. ID 432 is unique to the associated device 32 in that it enables or allows the associated device 32 to be reached on a network or networks exclusive of other devices. For instance, if associated device 32 is a cell phone, land-line phone or pager, then ID 432 would be a phone number. The ID 432 is sent from the mobile application server to the associated device 30 (which is used by the originating party) and can be displayed thereon. In the case of associated device 30 being a cell phone, the ID 432 can be displayed as the last number dialed entry or otherwise be placed into the call logs of the device 30. In some embodiments, the mobile application server configures associated device 30 such that the ID 432 can be called or connected to using a PTT or other smart calling feature. This may be achieved by directing the associated device 30 to place or sending the ID 432 directly to the PTT buffer in the smart calling module of the associated device 30.

Most cell phones have a "Talk" (or "Ok") button which initiates a call. Associated device 30 has a Talk button 430 and is preferably a mobile communication device such as a cell phone. In accordance with typical cell phone operation, pushing the "Talk" 430 button once will display the ID 432 on a display screen of the associated device 30. Pushing the Talk 430 button again in rapid succession will cause associated device 30 to place a call to the device identified by ID 432 (i.e. associated device 32). This enables the call to be automatically configured without manually inputting the ID 432 into the associated device 432. Even in cases where the ID 432 is already in a call log or local directory, the originating party would still have to select this entry from the log or directory manually. By sending the ID 432 automatically from the mobile application server and configuring the smart feature, it can be blindly activated (by pushing the Talk 430 or other such button) without any other action on the part of caller.

This process becomes more efficient if the associated device 30 has an advanced PTT feature. In this case the PTT is configured if accordance with the data session as described above, and all the user has to do to initiate a call to the destination party is press the PTT button, knowing that the PTT was automatically configured for this purpose.

Figure 4B:
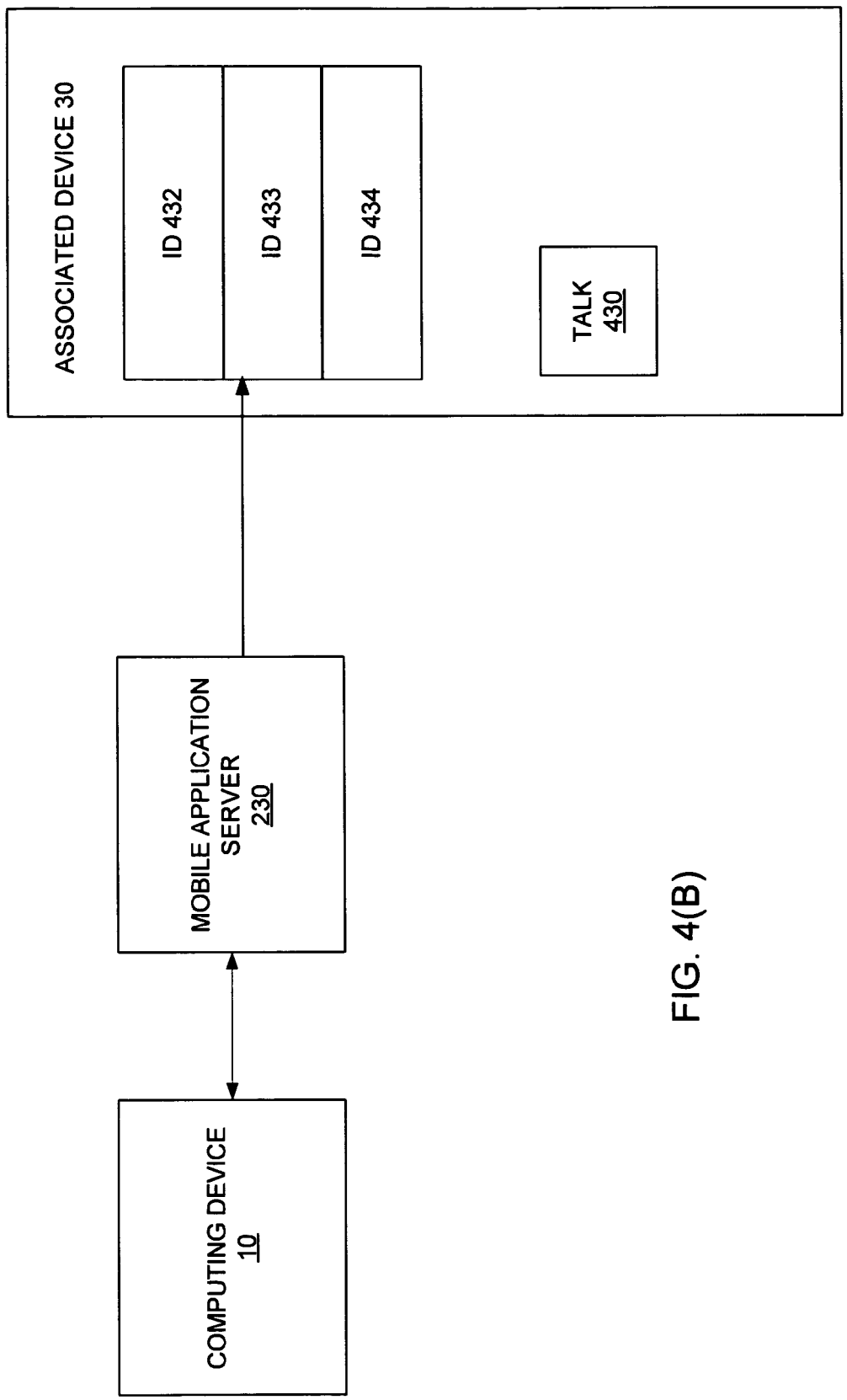
FIG. 4(B) is a block diagram of multi-party destination call configuration according to some embodiments of the invention.

FIG. 4(B) is a block diagram of multi-party destination configuration according to some embodiments of the invention. The operation of elements which are like numbered in FIGS. 4(a) and 4(B) operate in a similar fashion as described above except for the following. The computing device 10 sends a list of identifiers of different parties such as an entire buddy list or session participant list to mobile application server 230. For each party in the list, if necessary, the mobile application server 230 determines/looks-up a corresponding associated device ID. The mobile application server 230 then sends the entire list of IDs to originating party's associated device 30. For instance, a list of three possible destination parties would yield a list of three associated device IDs such as ID 432, ID 433 and ID 434. This list of IDs is sent to the associated device 30 to be displayed, placed into the call log or local directory, as desired. One of these IDs can then be selected by the originating party to place a call to the corresponding device.

Figure 5:
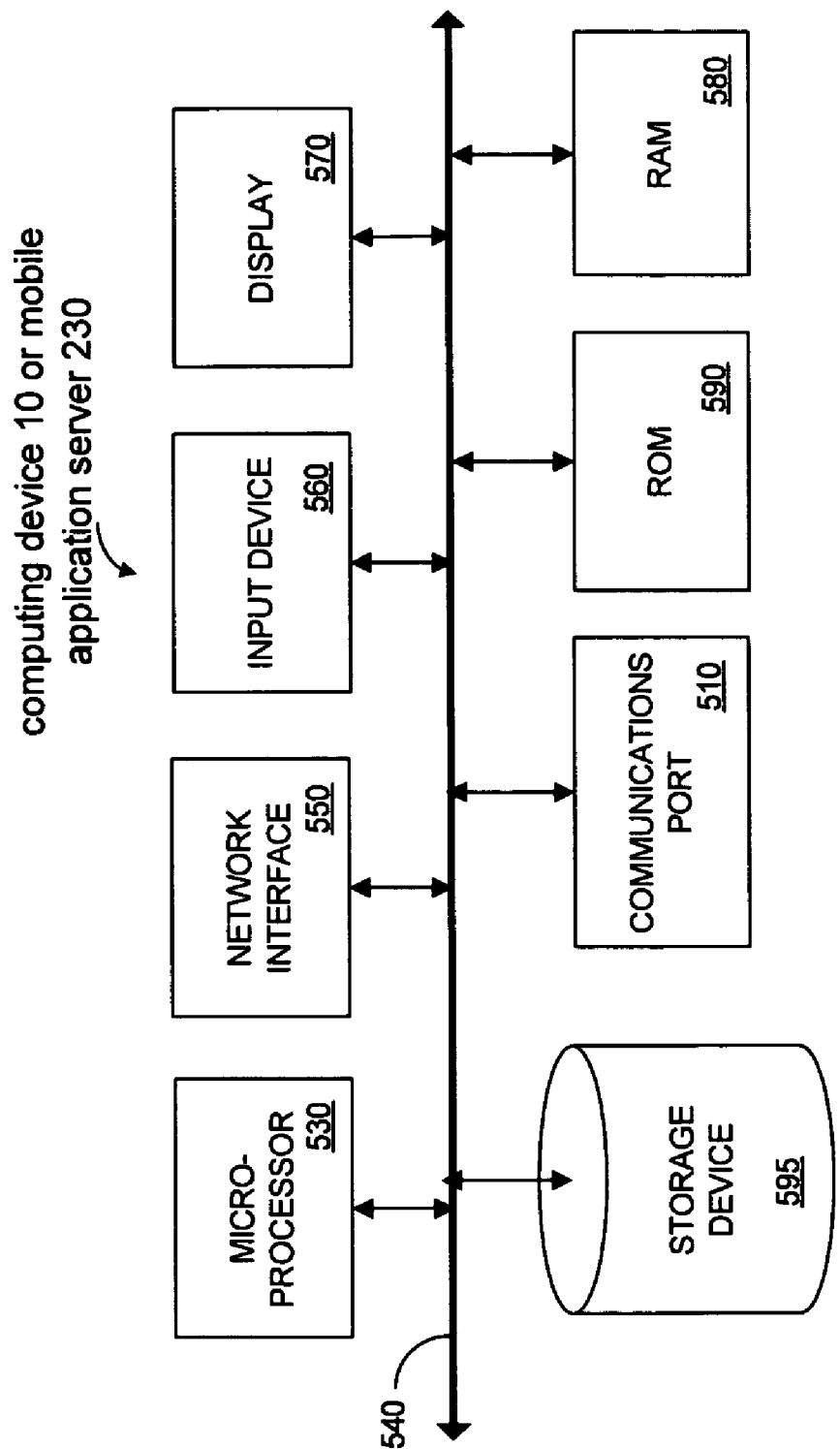
FIG. 5 is a block diagram of the internal architecture of a computing, device according to some embodiments of the invention.

FIG. 5 is a representative block diagram of computing device 10 or mobile application server 230 according to some embodiments. First, operation as computing device 10 will be described in detail, and then, operation as mobile application server 230 will be described. Many operating details in the description of elements computing device 10, below, can also be applied when those elements combine to operate as mobile application server 230.

Computing device 10 may comprise a single device or computer, a networked set or group of devices or computers, such as a workstation, laptop etc. Computing device 10 is typical of a data session-capable machine. Computing device 10 of FIG. 5 includes microprocessor 530 in communication with communication bus 540. Microprocessor 530 is used to execute processor-executable process steps so as to control the components computing device 10 to provide functionality according to embodiments of the present invention. Microprocessor 530 may comprise a Pentium™, or Itanium™ microprocessor manufactured by Intel Corporation. Other suitable processors may be available from Motorola, Inc., AMD, or Sun Microsystems, Inc. Microprocessor 530 also may comprise one or more microprocessors, controllers, memories, caches and the like.

Input device 560 and display 570 are also in communication with communication bus 540. Any known input device may be used as input device 560, including a keyboard, mouse, touch pad, voice-recognition system, or any combination of these devices. Input device 560 may be used by a user to input information and commands and select a destination party (parties) to initiate associated device call configuration.

Display 570 may be an integral or separate CRT display, a flat-panel display or the like. Display 550 is generally used to output graphics and text to an operator in response to commands issued by microprocessor 530. Display 570 may display presentation data and the like which is used during the collaboration session.

RAM (Random Access Memory) 580 is connected to communication bus 540 to provide microprocessor 530 with fast data storage and retrieval. In this regard, processor-executable process steps being executed by microprocessor 530 are typically stored temporarily in RAM 580 and executed therefrom by microprocessor 530. ROM (Read Only Memory) 590, in contrast, may provide storage from which data can be retrieved but to which data cannot be stored. Accordingly, ROM 590 may be used to store invariant process steps and other data, such as basic input/output instructions and data used during system boot-up or to control input device 560. One or both of RAM 580 and ROM 590 may communicate directly with microprocessor 530 instead of over communication bus 540, or on separate dedicated busses.

Data storage device 595 stores, among other data, processor-executable process steps of session management application 210 and the like (see FIG. 2 and associated description). The process steps and program code of session management application 210 and the like may be read from a computer-readable medium, such as a floppy disk, a CD-ROM, a DVD-ROM, a Zip™ disk, a magnetic tape, or a signal encoding the process steps/program code, and then stored in data storage device 595 in a raw, compressed, un-compiled and/or encrypted format. In alternative embodiments, hard-wired circuitry may be used in place of, or in combination with, processor-executable process steps for implementation of the processes described herein. Thus, embodiments are not limited to any specific combination of hardware, firmware and software.

Also illustrated is a network interface 550 which may be a wired or wireless Ethernet interface, a modem interface, and so on. In utilizing the various embodiments of the invention, the network interface 550 may be connected to or to provide or access a high-speed connection to the Internet or an Intranet providing access to the Internet or similar networks. Using such a network or networks, computing device 10 can communicate identifiers of destination parties to mobile application server 230.

Stored in data storage device 595 may also be other elements that may be necessary for operation of computing device 10, such as other applications, other data files, a network server, an operating system, a database management system and "device drivers" for allowing microprocessor 530 to interface with external devices. These elements are known to those skilled in the art, and are therefore not described in detail herein.

FIG. 5 may also represent a mobile application server 230. The mobile application server 230 would use network interface 550 to communicate with computing devices and associated devices, cellular networks, satellite networks and the like. Mobile application server 230 would also run software such as Look-Up/Configure 240 (see FIG. 2 and associated description) using program code loaded into RAM 580 and executed by microprocessor 530. Code and data for these applications as well as presentation data and the like can be stored on data storage 595 and the like. The mobile application server 230 may also have a connection to a separate cellular, satellite or other wireless networking capability so that it communicate ID information to associated devices which are mobile.

The particular arrangements of process steps described above are not meant to imply a fixed order; embodiments can be practiced in any order that is practicable. The processes described herein may be embodied as program code developed using an object-oriented language that allows the modeling of complex systems with modular objects to create abstractions that are representative of real world, physical objects and their interrelationships. However, embodiments may be implemented in many different ways using a wide range of programming techniques as well as hardwired in hardware systems or dedicated controllers. In addition, in some embodiments, many, if not all, of the elements described above are optional or can be combined into single elements.

Any embodiments described above are not intended to be limited to the specific form set forth herein, but are intended to cover such alternatives, modifications and equivalents as can reasonably be included within the spirit and scope of the appended claims.

What is claimed is:

1. A system for sending to an associated device utilized by a originating party a unique ID identifying an associated device utilized by a destination party, said originating party and destination party in a data session, said system comprising:

a first computing device utilized by said originating party in said data session, said data session including communication between said first computing device and a second computing device utilized by said destination party, said first computing device sending an identifier for said destination party obtained from said data session; and a mobile application server capable of communicating with said first computing device, said mobile application server utilizing said identifier for said destination party in order to send a unique ID to said associated device utilized by said originating party wherein said mobile application server includes a mechanism to look-up said unique ID based on said identifier;

wherein the unique ID enables the associated device utilized by said originating party to initiate one selected from a call and a connection with the associated device utilized by the destination party, said data session is at least one of a instant messaging session, an instant messaging conference, a conference call, and a data collaboration session, said identifier is sent for each of a plurality of other parties participating in said data session and a list of unique IDs corresponding to at least some other parties participating in said data session is sent to said associated device utilized by said originating party, the unique ID being a phone number, and the phone number being sent by said mobile application server in order to configure a push-to-talk capability of said associated device wherein the push-to-talk capability is activated by said originating party in order to place a call to said associated device utilized by said destination party.

2. A system according to claim 1 wherein said associated device utilized by said originating party is a mobile communication device.

3. A system according to claim 2 wherein said mobile communication device is at least one of a cellular telephone, a satellite telephone and a PDA.

4. A system according to claim 1 wherein said phone number is displayed on said associated device utilized by said originating party.

5. A system according to claim 1 wherein said call is a voice call.

6. A system according to claim 1 wherein said call is a data call.

7. A system according to claim 6 wherein said data call is short message service call.

8. A system according to claim 1 wherein said mobile application server and said computing device communicate via a data network.

9. A system for sending to an associated device utilized by a originating party a unique ID identifying an associated device utilized by a destination party, said originating party and destination party in a data session, said system comprising:
 a first computing device utilized by said originating party in said data session, said data session including communication between said first computing device and a second computing device utilized by said destination party, said first computing device sending an identifier for said destination party obtained from said data session; and
 a mobile application server capable of communicating with said first computing device, said mobile application server utilizing said identifier for said destination party in order to send a unique ID to said associated device utilized by said originating party wherein said mobile application server is a IP Multimedia Subsystem server and includes a mechanism to look-up said unique ID based upon said identifier;
 wherein said unique ID enables the associated device utilized by said originating party to initiate one selected from a call and a connection with the associated device utilized by the destination party, said identifier is sent for each of a plurality of other parties participating in said data session and a list of unique IDs corresponding to at least some other parties participating in said data session is sent to said associated device utilized by said originating party, the unique ID being a phone number, and the phone number being sent by said mobile application server in order to configure a push-to-talk capability of said associated device wherein the push-to-talk capability is activated by said originating party in order to place a call to said associated device utilized by said destination party.

10. A system according to claim 9 wherein said associated device utilized by said originating party is a mobile communication device.

11. A system according to claim 10 wherein said mobile communication device is at least one of a cellular telephone, a satellite telephone and a PDA.

12. A system according to claim 9 wherein said phone number is displayed on said associated device utilized by said originating party.

13. A system according to claim 9 wherein said call is a voice call.

14. A system according to claim 9 wherein said call is a data call.

15. A system according to claim 14 wherein said data call is short message service call.

16. A system according to claim 9 wherein said mobile application server and said computing device communicate via a data network.

17. A method during a data session for automatic call configuration of an originating party's associated device to a destination party's associated device, said originating party and destination party participating in said data session, the method comprising:
 establishing said data session between a first computing device utilized by said originating party and a second computing device utilized by said destination party wherein said data session includes at least one of a data collaboration session, an instant messaging session, a conferencing session and instant message conferencing session;
 sending from said first computing device utilized by said originating party an identifier for said destination party, said identifier being obtained from said data session;
 determining a unique ID for said destination party's associated device based on said identifier for said destination party wherein determining includes looking up said unique ID using said identifier for said destination party;
 sending said unique ID to said originating party's associated device such that the originating party's associated device is enabled to initiate one selected from a call and a connection with the destination party's associated device;
 repeating sending, determining and sending a unique ID for each of a plurality of destination parties wherein said originating party's associated device receives a list containing each said unique ID; and
 configuring a calling feature on said originating party's associated device with said unique ID wherein said calling feature is one or more of a last number dialed feature, a push-to-talk capability, and a call log selection feature and wherein said calling feature is activated by said originating party in order to place said call to said destination party's associated device.

18. A method according to claim 17 further comprising:
 said originating party selecting said destination party.

19. A method according to claim 18 wherein said sending from said originating party is performed by a computing device.

20. A method according to claim 17 further comprising:
 receiving said identifier for said destination party.

21. A method according to claim 17 wherein said unique ID is part of said identifier for said destination party.

22. A method according to claim 17 wherein said unique ID is a key to said identifier for said destination party.

23. A method according to claim 17 further comprising:
 said originating party's associated device displaying said unique ID.

24. A method according to claim 17 further comprising:
 sending said identifier for said destination party to said originating party's associated device in addition to said unique ID.

25. A method according to claim 17 wherein said originating party's associated device is a mobile communication device.

26. A method according to claim 25 wherein said mobile communication device is at least one of a cellular telephone, a satellite telephone and a PDA.

27. A method according to claim 17 wherein said mobile application server is coupled to at least one wireless communication network, said at least one wireless communication network capable of communicating with said mobile communication device.

28. A method according to claim 17 wherein said call is a voice call.

29. A method according to claim 17 wherein said call is a data call.

30. A method according to claim 29 wherein said data call is short message service call.

31. A method according to claim 17 wherein each said unique ID in said list is accompanied by a corresponding said identifier of said destination party.

32. A method during a data session for automatic call configuration of an originating party's associated device to a destination party's associated device, said originating party and destination party participating in said data session, the method comprising:
- establishing said data session between a first computing device utilized by said originating party and a second computing device utilized by said destination party;
- sending from said first computing device utilized by said originating party an identifier for said destination party, said identifier being obtained from said data session;
- determining a unique ID for said destination party's associated device based on said identifier for said destination party wherein determining includes looking up said unique ID using said identifier for said destination party and determining said unique ID is performed by a mobile application server wherein the mobile application server is a IP Multimedia Subsystem Server;
- sending said unique ID to said originating party's associated device such that the originating party's associated device is enabled to initiate one selected from a call and a connection with the destination party's associated device wherein sending said unique ID is performed by the mobile application server;
- repeating sending, determining and sending a unique ID for each of a plurality of destination parties wherein said originating party's associated device receives a list containing each said unique ID; and
- configuring a calling feature on said originating party's associated device with said unique ID wherein said calling feature is one or more of a last number dialed feature, a push-to-talk capability, and a call log selection feature and wherein said calling feature is activated by said originating party in order to place said call to said destination party's associated device.

33. A method according to claim 32 wherein said sending from said originating party is performed by a computing device and the method further comprising:
said originating party selecting said destination party.

34. A method according to claim 32 further comprising:
receiving said identifier for said destination party.

35. A method according to claim 32 wherein said unique ID is part of said identifier for said destination party.

36. A method according to claim 32 wherein said unique ID is a key to said identifier for said destination party.

37. A method according to claim 32 further comprising:
said originating party's associated device displaying said unique ID.

38. A method according to claim 32 further comprising:
sending said identifier for said destination party to said originating party's associated device in addition to said unique ID.

39. A method according to claim 32 wherein said originating party's associated device is a mobile communication device wherein the communication device is at least one of a cellular telephone, a satellite telephone, and a PDA.

40. A method according to claim 32 wherein said mobile application server is coupled to at least one wireless communication network, said at least one wireless communication network capable of communicating with said mobile communication device.

41. A method according to claim 32 wherein said call is one selected from a voice call and a data call.

42. A method according to claim 32 wherein said data call is short message service call.

* * * * *